United States Patent [19]
Abraham et al.

[11] Patent Number: 5,410,702
[45] Date of Patent: Apr. 25, 1995

[54] SLOT OBJECTS FOR AN OBJECT ORIENTED PROGRAMMING SYSTEM

[75] Inventors: Robert L. Abraham; Richard E. Moore, both of Marietta; William L. Rich, Stone Mountain; Floyd W. Shackelford, Buford; John R. Tiller, Jr., Peachtree City, all of Ga.; Richard S. Briggs, Jr., Bloomingdale, Ill.

[73] Assignee: International Business Machines Corporation, Armonk, N.Y.

[21] Appl. No.: 10,441

[22] Filed: Jan. 22, 1993

Related U.S. Application Data

[63] Continuation of Ser. No. 425,746, Oct. 23, 1989, abandoned.

[51] Int. Cl.$^6$ .............................................. G06F 15/40
[52] U.S. Cl. ...................................... 395/700; 395/600; 364/DIG. 1; 364/282.1; 364/283.4
[58] Field of Search ................................. 395/62, 700; 364/DIG. 1, DIG. 2

[56] References Cited

U.S. PATENT DOCUMENTS

| | | |
|---|---|---|
| 4,325,120 | 4/1982 | Colley et al. . |
| 4,558,413 | 12/1985 | Schmidt et al. . |
| 4,622,633 | 11/1986 | Ceccon et al. . |
| 4,635,208 | 1/1987 | Coleby et al. . |
| 4,675,829 | 6/1987 | Clemenson .......................... 364/513 |
| 4,697,242 | 9/1987 | Holland et al. . |
| 4,713,753 | 12/1987 | Boebert et al. . |
| 4,714,996 | 12/1987 | Gladney et al. . |
| 4,791,550 | 12/1988 | Stevenson et al. . |
| 4,803,642 | 2/1988 | Muranaga . |
| 4,853,843 | 8/1989 | Ecklund . |
| 4,943,933 | 7/1990 | Miyamoto et al. .................. 364/513 |
| 4,967,371 | 10/1990 | Muranaga et al. .................. 364/513 |

OTHER PUBLICATIONS

IBM Technical Disclosure Bulletin, "Providing Three Kinds Of Attributes For Object Data And Properties", p. 5985, vol. 27, No. 10B, Mar. 1985.

*A Third Generation Smalltalk-80 ™ Implementation*, P. J. Caudill et al., OOPSLA 1986 Proceedings, Sep. 1986, pp. 119–130.

European Search Report, Appln. No. EP 90 48 0148, 31 Jul. 1992.

*OOPS—An Object Oriented Programming System With Integrated Data Management Facility*, G. Schlageter et al., Proceedings Fourth International Conference on Data Engineering, IEEE 1988, pp. 118–125.

*What Price is Smalltalk?*, D. Ungar et al., IEEE, Jan. 1987, pp. 67–74.

*Primary Examiner*—Gareth D. Shaw
*Assistant Examiner*—Kakali Chaki
*Attorney, Agent, or Firm*—Bell, Seltzer, Park & Gibson

[57] ABSTRACT

Data may be manipulated directly in an object oriented programming system by providing a slot object which contains data within its frame. In contrast with conventional objects, the frames of which only contain attributes of the associated instances, the slot object contains actual data therein. Since this data is not contained in a separate object, a unique object identified need not be provided, thus simplifying object management. Unique messages also need not be provided so that message overhead is simplified. Memory fragmentation is also reduced because simple and tightly bound data may be encapsulated within a larger slot object. The data area in the slot object may be of fixed or variable size.

1 Claim, 7 Drawing Sheets

FRAME BEGINS AT ADDRESS A —  A | ARBITRARY SLOTS |
| SLOT OBJECT 1 |
| ARBITRARY SLOTS |

FRAME'S VARIABLE AREA BEGINS HERE  B | SLOT OBJECT 1's VARIABLE AREA.  IT BEGINS AT ADDRESS B. |

FIG. 6.

A | LOCAL SLOT OBJECT 2 |

B | SLOT OBJECT 2's VARIABLE AREA. |

FIG. 7.

| ARBITRARY SLOTS |
| SLOT OBJECT 3 |
| ARBITRARY SLOTS |

A | SLOT OBJECT 3's VARIABLE LENGTH USED. |

FIG. 8.

SLOT OBJECTS FOR AN OBJECT ORIENTED PROGRAMMING SYSTEM

This is a continuation of U.S. application Ser. No. 07/425,746 filed on Oct. 23, 1989, now abandoned.

FIELD OF THE INVENTION

This invention relates to object oriented programming systems, and more particularly to a process and apparatus for directly manipulating objects in an object oriented programming system.

BACKGROUND OF THE INVENTION

Object Oriented Programming systems and processes have been the subject of much investigation and interest in state of the art data processing environments. Object Oriented Programming is a computer program packaging technique which provides reusable and easily expandable programs. In contrast with known functional programming techniques which are not easily adaptable to new functional requirements and new types of data, object oriented programs are reusable and expandable as new requirements arise. With the ever increasing complexity of computer based systems, object oriented programming has received increased attention and investigation.

In an object oriented programming system, the primary focus is on data, rather than functions. Object oriented programming systems are composed of a large number of "objects". An object is a data structure and a set of operations or functions that can access that data structure. The data structure may be represented as a "frame". The frame has many "slots", each of which contains an "attribute" of the data in the slot. The attribute may be a primitive (i.e. an integer or string) or an Object Reference which is a pointer to another object's instance or instances (defined below). Each operation (function) that can access the data structure is called a "method".

FIG. 1 illustrates a schematic representation of an object in which a frame is encapsulated within its methods. FIG. 2 illustrates an example of an object, in which the data structure relates to employee data, and a number of methods surround this data structure. One method, for example, obtains the age of an employee. Each defined object will usually be manifested in a number of instances. Each instance contains the particular data structure for a particular example of the object. For example, an object for individual employee named Joyce Smith is an instance of the "employee" object.

Object oriented programming systems provide two primary characteristics which allow flexible and reusable programs to be developed. These characteristics are referred to as "encapsulation" and "inheritance". As may be seen from FIG. 1, the frame is encapsulated by its methods (functions). A wall of code has been placed around each piece of data. All access to the frame is handled by the surrounding methods. Data independence is thereby provided because an object's data structure is accessed only by its methods. Only the associated methods know the internal data structure. This ensures data integrity.

The "inheritance" property of object oriented programming systems allows previously written programs to be broadened by creating new superclasses and subclasses of objects. New objects are described by how they differ from preexisting objects so that entirely new programs need not be written to handle new types of data or functions.

FIG. 3 illustrates the inheritance property. For ease of illustration, the objects are illustrated as rectangles rather than as circles, with the object name at the top of a rectangle, the frame below the object name and the methods below the frame. Referring to FIG. 3, three object classes are illustrated for "salesperson", "employee" and "person" where a salesperson is a "kind of" employee, which is a "kind of" person. In other words, salesperson is a subclass of employee and employee is the superclass of salesperson. Similarly, employee is the subclass of person and person is the superclass of employee. Each class shown includes three instances. B. Soutter, W. Tipp and B. G. Blue are salespersons. B. Abraham, K. Yates and R. Moore are employees. J. McEnro, R. Nader and R. Reagan are persons. In other words, an instance is related to its class by an "is a" relation.

Each subclass "inherits" the frame and methods of its superclass. Thus, for example, a salesperson frame inherits age and hire date objects from the employee superclass as well as promote methods. Salesperson also includes a unique quota attribute and a pay commission method. Each instance can access all methods and frames of its superclass, so that, for example, B. G. Blue can be promoted.

In an object oriented system, a high level routine requests an object to perform one of its methods by sending the object a "message" telling the object what to do. The receiving object responds to the message by choosing the method that implements the message name, executing this method and then returning control to the calling high level routine, along with the results of the method.

It will be understood by those having skill in the art that an object oriented programming system typically runs on a data processor which includes volatile memory, i.e., memory which is erased or overwritten during when a session is terminated or when power is removed from the data processor, and nonvolatile memory such as direct access storage devices (DASD-disk files) or tape files in which data is permanently stored. The volatile memory is often referred to as Random Access Memory (RAM) or simply as "memory". The nonvolatile memory is often referred to as a "database". The term database, as used herein, refers to any physical, nonvolatile data storage medium, rather than to a particular database technology or product.

As described above, object oriented programming systems provide encapsulation and inheritance of complex programs, thereby providing flexibility and reuse of programs. However, complex programs which include large numbers of objects impact system performance in three major areas: object management, message overhead and memory fragmentation.

For large numbers of objects, object management consumes an inordinate amount of system resources because an object manager must maintain a large object table or tables containing the necessary object names and pointers to their locations. The object table occupies large amount of storage, and access thereto is also time consuming. Moreover, large numbers of objects require large numbers of messages to operate upon the objects. A complicated message manager must manage these messages. Finally, every object occupies a distinct segment of memory. Memory thereby becomes fragmented into small chunks which are difficult to utilize efficiently.

SUMMARY OF THE INVENTION

It is therefore an object of the invention to provide an improved object oriented computer system.

It is another object of the invention to provide a process and apparatus for manipulating objects in an object oriented computer system.

It is yet another object of the invention to provide a process and apparatus for manipulating objects in an object oriented computer system which simplifies object management requirements.

It is yet a further object of the invention to provide a process and apparatus for manipulating objects in an object oriented computer system which reduces message overhead.

It is still another object of the invention to provide a process and apparatus for manipulating objects in an object oriented computer system which reduces memory fragmentation.

It is still a further object of the invention to provide a process and system for manipulating objects in an object oriented computer system without degrading object encapsulation and inheritance.

These and other objects are provided, according to the present invention, by providing at least one slot object for an object oriented computer system. The slot object contains in its frame, an area having predetermined data for at least one associated instance. In contrast with other objects whose frames only contain attributes of the associated instances, the slot object contains actual data therein. In other words, when a slot is declared, one does not just get a reference to the data. One gets the entire data structure included in-line.

The data in the slot object may be directly manipulated from within the slot object. Accordingly, this data does not need an enterprise-wide object identifier in the object manager nor does it need to be directly accessible via a separate message. Object management and message overhead are thereby greatly simplified. Moreover, memory need not be allocated for a unique object, nor need memory be deallocated when the object is freed. Memory fragmentation is thereby reduced. Accordingly, the slot object allows many classes of data to be manipulated as full fledged objects, without the overhead of the more general object identification scheme.

The slot object of the present invention stems from the realization that a typical object oriented system includes many objects which are simple, do not dynamically vary in size or content, exist only within the containment of some more complex object, and are only selectable by name within the scope of the containing object. By declaring these simple and tightly bound objects as slot objects, data encapsulation and inheritance are preserved, while improving system performance for object management, message overhead and memory fragmentation.

According to the present invention, a slot object for an object oriented computer system contains at least one slot having therein data attributes of the corresponding slot object instances and at least one slot having therein a data set from an associated instance. The associated instance does not contain this data i.e. it is free of this data, because this data is located within the slot object.

The slot object includes an object reference (OREF) to the encapsulated data in the slot object. In contrast with an OREF in a conventional object which contains a pointer to an object's address location in an object table, the OREF of a slot object contains a pointer to the address of the first piece of data encapsulated in the slot object. This OREF is called a "Self-Reference".

In one embodiment of the present invention, the slot object contains a variable length area within the slot object frame, with the predetermined data being contained in the variable length area. Accordingly, variable length predetermined data may be accommodated. The slot object includes a number of variable area references containing information about the variable area, such as its address, total allowed length and total length being used.

BRIEF DESCRIPTION OF THE DRAWINGS

FIG. 6 illustrates a slot object according to the present invention.

FIG. 7 illustrates another slot object according to the present invention.

FIG. 8 illustrates yet another slot object according to the present invention.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like components throughout.

OBJECT ORIENTED COMPUTER SYSTEM

In an object oriented computer system, work is accomplished by sending action request messages to an object which contains (encapsulates) data. The object will perform the requested action on the data according to its predefined methods. The requestor of the action need not know what the actual data looks like or how the object manipulates it.

An object's class defines the types and meanings of the data and the action requests (messages) that the object will honor. The individual objects containing data are called instances of the class. Classes generally relate to real-world things. For example, "Parts" may be a class. The data elements (slots) of a part might be a part number, a status and a part type. The instances of this class represent individual parts, each with its own part number, status, and type information. The programs performing the requested actions are called methods of the class.

Object classes can be defined to be subclasses of other classes. Subclasses inherit all the data characteristics and methods of the parent class. They can add additional data and methods, and they can override (redefine) any data elements or methods of the parent class. While most messages are sent to object instances, the message that requests that a new instance be created is sent to an object class. The class will cause a new instance to be created and will return an object identifier by which that object will be known.

The sender of an action request message need not know the exact class of the object to which it is sending the message. As long as the target object either defines a method to handle the message or has a parent class that defines such a method, then the message will be handled using the data in the object instance and the method in its class or its parent class. In fact, it need not be an immediate parent, but may be a parent's parent, etc. The sender of the method need only have the object ID of the receiving object. This property of object oriented systems is called "inheritance". The inheritance property is used in the present invention.

Figure 1:
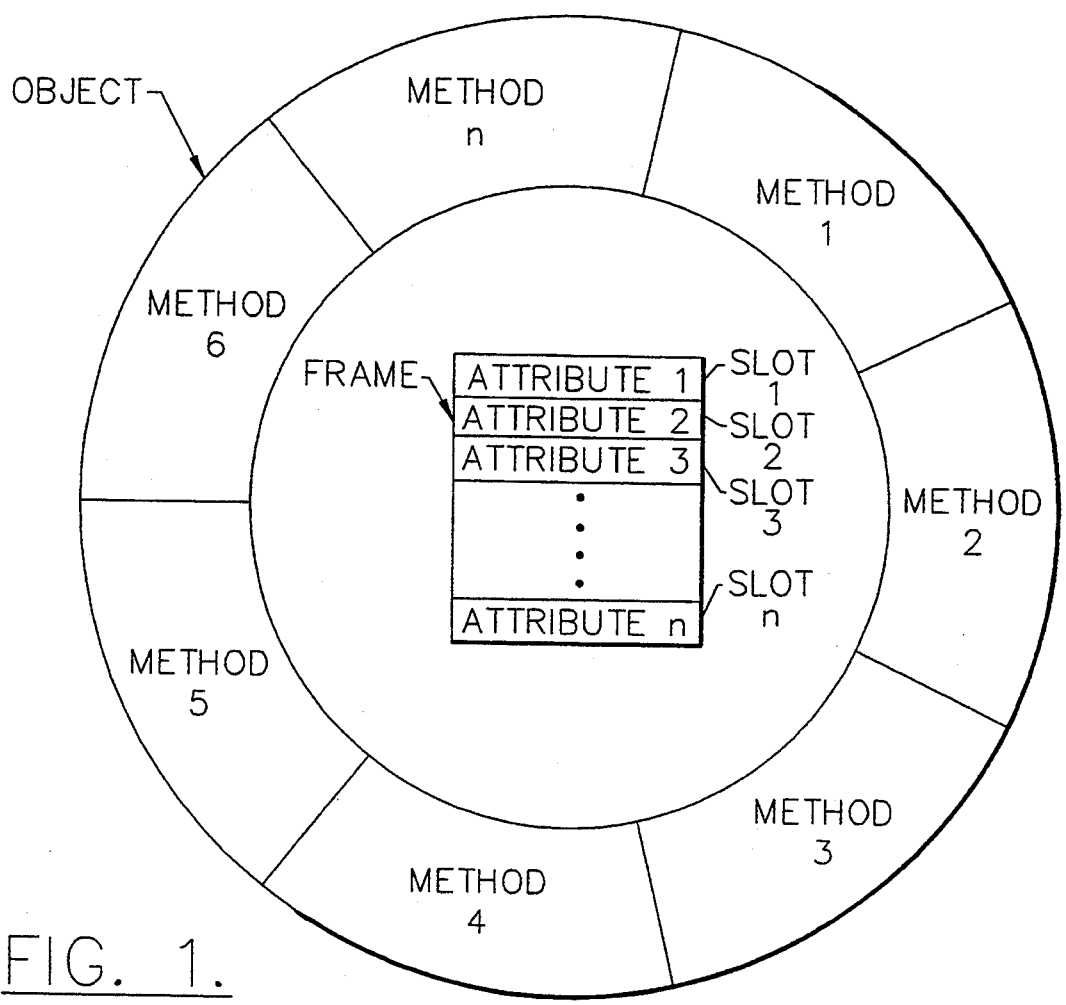
FIG. 1 illustrates a schematic representation of an object.
Figure 2:
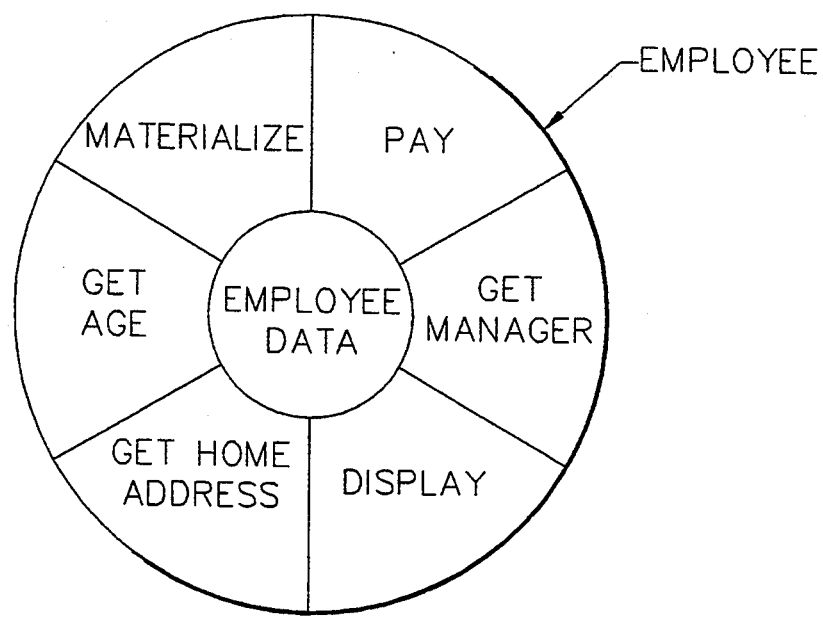
FIG. 2 illustrates a schematic representation of an example of an object.
Figure 3:
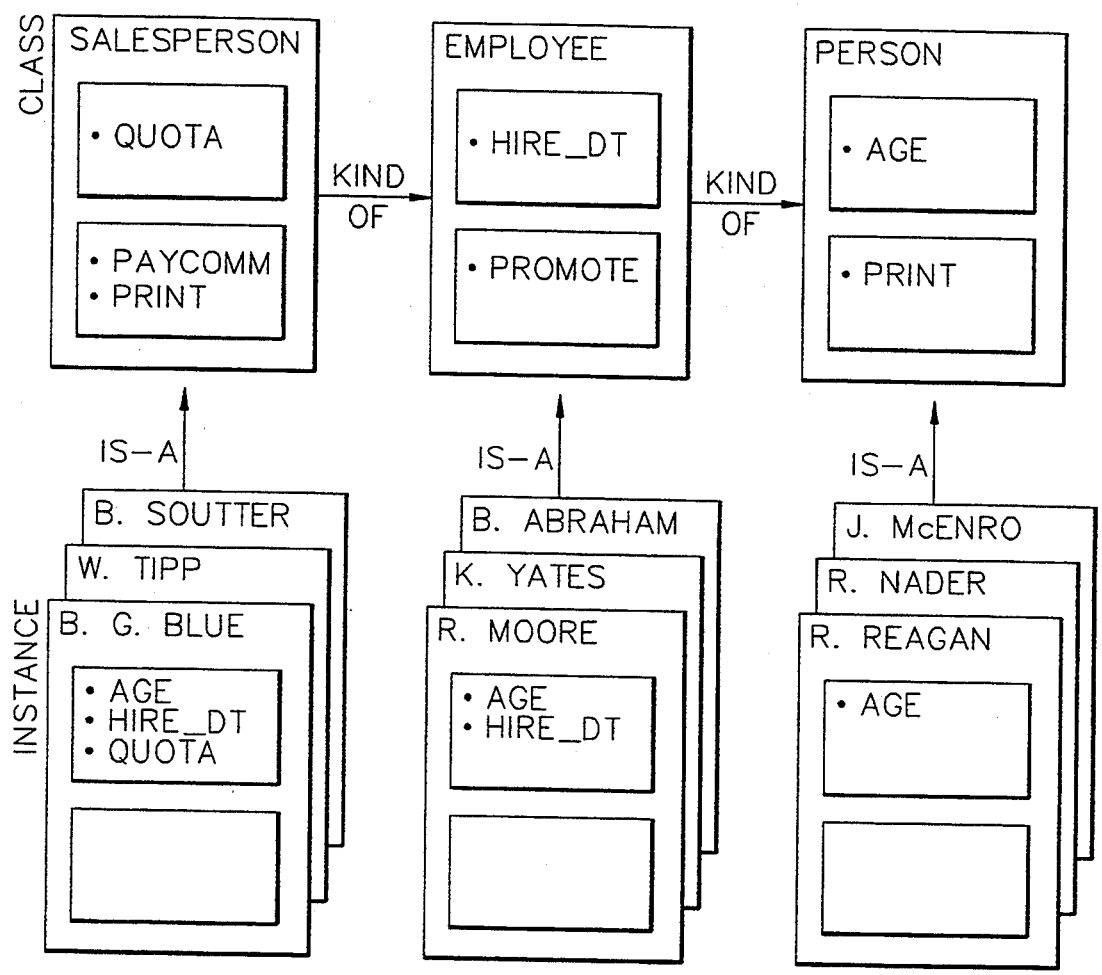
FIG. 3 illustrates the inheritance property of objects.
Figure 4:
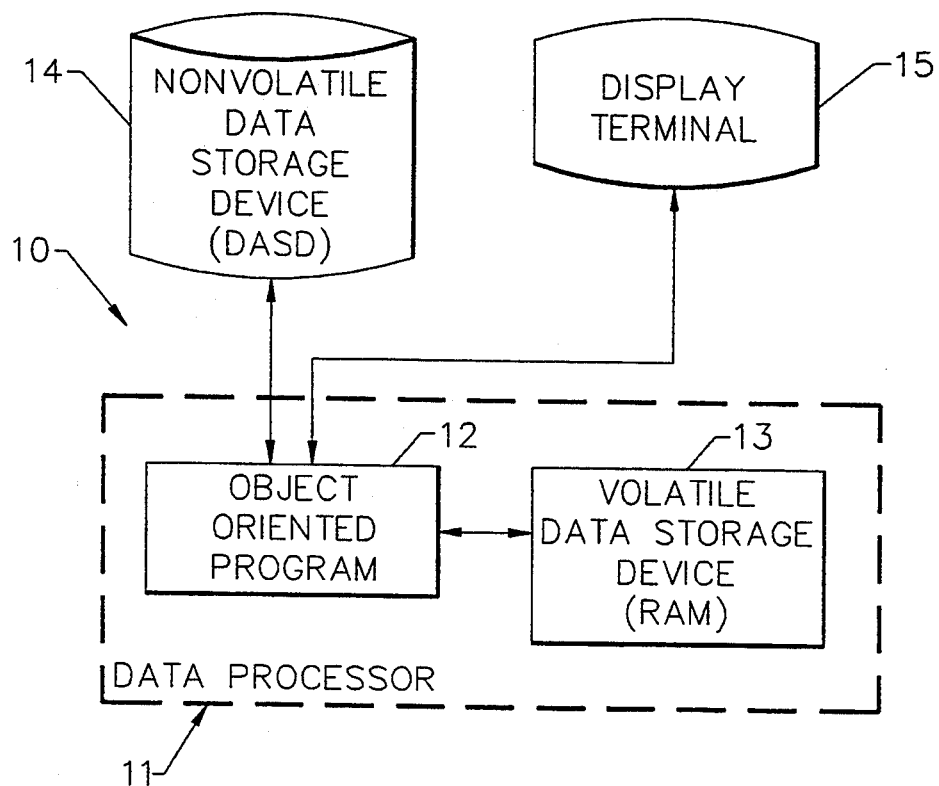
FIG. 4 illustrates a schematic block diagram of an object oriented computer system according to the present invention.

Referring now to FIG. 4, a schematic block diagram of an object oriented computer system 10 is illustrated. The system 10 includes a data processor 11 which may be a mainframe computer, minicomputer or personal computer. For large databases having multiple users, a mainframe computer is typically employed. As is well known to those having skill in the art, the data processor 10 includes a volatile data storage device 13, typically random access memory (RAM) for providing a working store for active data and intermediate results. Data in RAM 13 is erased when power to the data processor 11 is removed or a new user session is begun. System 10 also includes a nonvolatile data storage device 14 for permanent storage of objects. Device 14 may be a direct access storage device (DASD-a disk file) a tape file, an erasable optical disk or other well known device. Nonvolatile data storage device 14 will also be referred to herein as a "database". Volatile data storage device 13 will also be referred to as "memory". A display terminal 15 including a cathode ray tube (CRT) or other display, and a keyboard, is also shown.

An object oriented operating program 12 is also included in data processor 11. Object oriented operating program 12 may be programmed in object oriented languages such as "C" or "Smalltalk" or variations thereof, or in conventional programming languages such as FORTRAN or COBOL. The design of an object oriented operating program 12 is well known to those skilled in the art of object oriented programming systems, and will only be described generally below.

Figure 5:
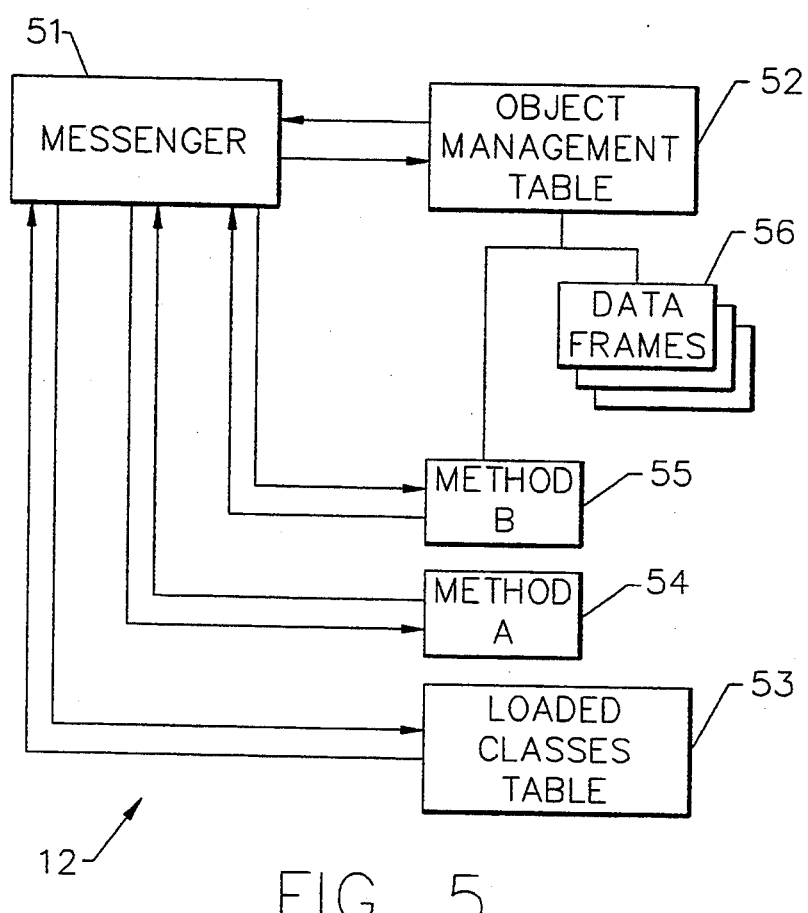
FIG. 5 illustrates a schematic block diagram of an object oriented program according to the present invention.

Referring now to FIG. 5, the main components of an object oriented program (12, FIG. 4) will be described. A more detailed description of the design and operation of an object oriented program is provided in "Object Oriented Software Construction", by Bertrand Meyer, published by Prentice Hall in 1988, the disclosure of which is incorporated herein by reference.

Referring to FIG. 5, object oriented program 12 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 12 will now be described for the example illustrated in FIG. 5, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

SLOT OBJECT CLASS

The Slot Object class of the present invention provides improved performance while providing the same function as normal objects. According to the invention, slot objects are utilized for simple objects which do not dynamically vary in size or content. Slot objects are data areas that have methods on them. Unlike conventional objects in an object oriented computer system, slot objects only exist within an enclosing object or instance or as local data within a method. According to the present invention, any object instance which is used exclusively by some other object instance may be provided as a slot object. The slot objects are not visible outside of their enclosing instance or method. Rather, are only selectable by name from within the containing object.

Slot objects do not have object management table entries, nor do they require object management table entries. When a slot object is declared, the entire data structure is included in line rather than only a reference to the data. The slot object's object reference is the first piece of data in the slot object's data area. Thus, slot objects appear as smart data areas rather than normal objects.

The use of slot objects according to the invention provides a significant performance savings in an object oriented computer system, compared to the use of more general objects, while also providing the advantages of encapsulation and dynamic messaging. They allow many classes of data to be manipulated as full-fledged objects without the overhead of the more general object identification scheme. Since very small objects of only a few bytes in size are included in line, memory is less likely to be fragmented into small, unusable chunks. "Heap" memory (i.e. the portion of RAM available to a user for temporary storage) does not need to be allocated when the slot object is created nor recovered when freed. Since all objects are included in line and are not located in Object Location Tables, data addresses need not be resolved. Thus, the object need not be located in this table before the message can be completed. The Object Manager need not maintain tables, pointers, and the like for slot objects. Thus, memory utilization for actual data and storage overhead are enhanced. Access time is also enhanced since no indirect addressing using pointers and the like needs to be resolved.

The object reference for a slot object appears as the first part of the contents of the slot holding the slot object. Therefore, the slot object contains both the reference and the data. When the slot object is written to the database, the entire slot object data structure is copied out.

According to another aspect of the present invention, variable areas are provided within the frame for the slot object to use. In order to use the variable areas, adequate space must be allocated for that variable area or reallocated as needed.

Slot objects with variable areas are not directly assignable. Since each variable area slot object takes up a different amount of storage, only slot objects of like types can be assigned. The values in the slot object may prevent a direct assignment, because certain knowledge about the variable areas can be lost. For example, to assign Slot_Object_B to Slot_Object_A, . "A.-Copy_Slot_Object (B);" may be coded. This copies the variable area and the updatable values from B to A. If B's variable areas will not fit into the variable area that A has allocated, then the portion of B's variable area which extends beyond that in A's variable area is truncated and therefore lost.

Another example of assignability for slot objects utilizes the standard SELF statement. "SELF" refers to the entire current structure and not just the reference to the current object. Therefore, "a:=SELF;" results in a slot object structure assignment within a slot object class methods rather than an object reference assignment as for normal objects.

SLOT OBJECT CLASS: ATTRIBUTES

The instances of the Slot_Object class include the following attributes:
Self_Reference: object_reference;
The instances of variable area Slot_Objects also include the following attributes:
Var_Area_Offset: access byte;
Var_Area_Total_Len: long;
Var_Area_Len_Used: long;
Var_Area_Address: access byte;
Self_Reference Self_Reference is the object reference used to call the slot object. It is the first part of the data area for a slot object.

Variable_Area_Offset

Variable_Area_Offset is the offset from the top of an enclosing frame to the variable area near the bottom of the frame. Referring to FIG. 6, a frame having a slot object therein is shown. For slot objects enclosed within the frame, Variable_Area_Offset represents the value of Address_B minus Address_A. Note that contiguous storage is represented. This attribute is used only by the messenger when calculating an enclosed slot object's variable area address. It is set at create time and is never updated.

Variable_Area_Total_Length

Variable_Area_Total_Length is the total size (in bytes) of the variable area. This attribute is used by the slot object methods to prevent the slot object from updating memory beyond the bounds of its variable area. It is set at create time and is never updated. Referring to FIG. 8, Variable_Area_Total_Length represents the entire size of the box_A.

Variable_Are_Length_Used

Variable_Area_Length_Used is the current amount of the variable area being used. It is set to zero at create time and is updated whenever values are put into the variable area. Referring to FIG. 8, Variable_Area_Length_Used represents the upper portion of box_A.

Variable_Area_Address

Variable_Area_Address is used by the slot object methods as a direct address to the slot object's variable area. It is set at create time for non-enclosed variable area slot objects. For enclosed variable area slot objects it is recalculated by the messenger on every call to the slot object.

Slot object methods use a direct pointer to their data, while frame object methods use indirect addressing. Slot objects also have the notion of an "enclosing area". A slot object's enclosing area is either the frame object in which it is contained (if it resides within a frame object), or the slot object structure itself (if it is not contained within a frame object.) Frame objects have no concept of an "enclosing area". The object manager is responsible for providing the methods with the address of their data and the address of the "enclosing area". Because of these differences between slot objects and instance objects, the object manager has to be prepared to execute different set up code depending on the type of the object. For example, a slot object need not be materialized.

Other features of slot objects include redefining attribute types and routine parameters. In order to redefine the type of a slot object attribute, the new slot object structure type must not take up any more space than the original slot object structure type since space is fixed. Alternative embodiments may provide for extra storage to slot object structures or disallowing the redefinition of attributes which are slot objects. In order to redefine a routine parameter that is a slot object, the new slot object structure must take up the same amount of storage on the stack as the original type. Alternative embodiments include those mentioned above for slot object attributes, namely, the addition of extra storage to the slot object structures or disallowance of redefinition.

EXAMPLES

The features of this invention will be further described in three examples. Example 1 describes the messages and storage support for processing normal objects without using the slot object of the present invention. Example 2 describes the messaging and storage support for processing slot objects of the present invention. Example 3 describes the messaging and storage support for processing slot objects having variable areas.

In all examples, the term "database" is used to refer to a nonvolatile data storage device. The terms "RAM" and "memory" are used to refer to a volatile data storage device.

EXAMPLE 1: THREE FRAMES-NO SLOT OBJECTS

The first example demonstrates the messaging and storage support necessary to manipulate a first Frame, Frame__1, which contains an object reference (OREF) to a second Frame, Frame__2, which, in turn, contains an OREF to a third Frame, Frame__3. These frames may be considered in terms of specific names such as "Door" for Frame__1, "Door Knob" for Frame__2, and "Bolt" for Frame__3.

Figure 9:
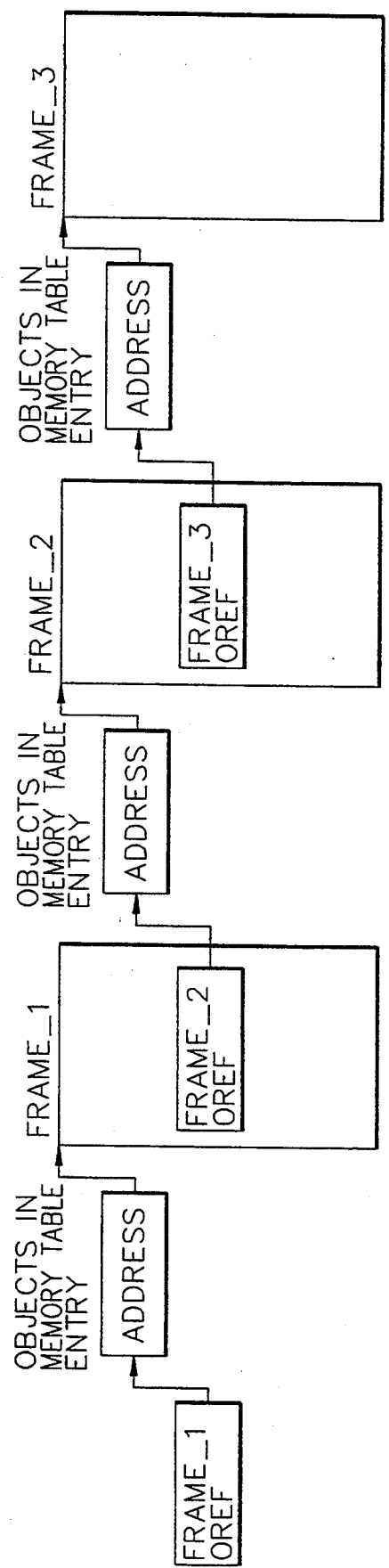
FIG. 9 illustrates manipulation of conventional frames which do not contain a slot object of the present invention.

No slot objects are used in Example 1. Accordingly, the three frames each must occupy an entry in the Object Management Table (52, FIG. 5), also referenced to as the Objects__In__Memory__Table. This table retains the object and corresponding address. In turn, this requires the Messenger (51, FIG. 5) to resolve the actual data address from the address in the table with each message call. For this example, the in-memory representation is depicted in FIG. 9.

In object oriented programming, a frame is a conceptual representation of an object. Initially, some method which contains an OREF to Frame__1, sends a message to Frame__1. The address of Frame__1's Objects__In__Memory__Table entry is contained within this OREF. The Messenger receives the OREF and checks the Objects__In__Memory__Table to determine if the object (Frame__1) is in memory. Assuming that Frame__1 is in memory, the Messenger resolves the method address obtained from the method table. The Messenger then sets up the data addressing through the Objects__In__Memory__Table entry. The specified method is then invoked.

Next, the invoked method in Frame__1 sends a message to Frame__2. The Messenger receives the OREF and checks the Objects__In__Memory__Table to determine if the object (Frame__2) is in memory. Assuming that Frame__2 is in memory, the Messenger resolves the method address. The Messenger then sets up the data addressing through the Objects__In__Memory__Table entry. The specified method is then invoked.

Finally, the invoked method in Frame__2 sends a message to Frame__3. The Messenger receives the OREF and checks the Objects__In__Memory__Table to determine if the object (Frame__3) is in memory. Assuming that Frame__3 is in memory, the Messenger resolves the method address. The Messenger then sets up the data addressing through the Objects__In__Memory__Table entry. The specified method is then invoked.

EXAMPLE 2: FRAME WITH SLOT OBJECT

Example 2 illustrates the use of slot objects according to the present invention. Example 2 provides the messaging and storage support necessary to manipulate a Frame, Frame__1, which contains a Slot Object, Slot__Obj__1, which, in turn, contains another Slot Object, Slot__Obj__2. This example might be more easily considered in terms of a less abstract example, such as Door for Frame__1, Door Knob for Slot__Obj__1, and Bolt for Slot__Obj__2.

Figure 10:
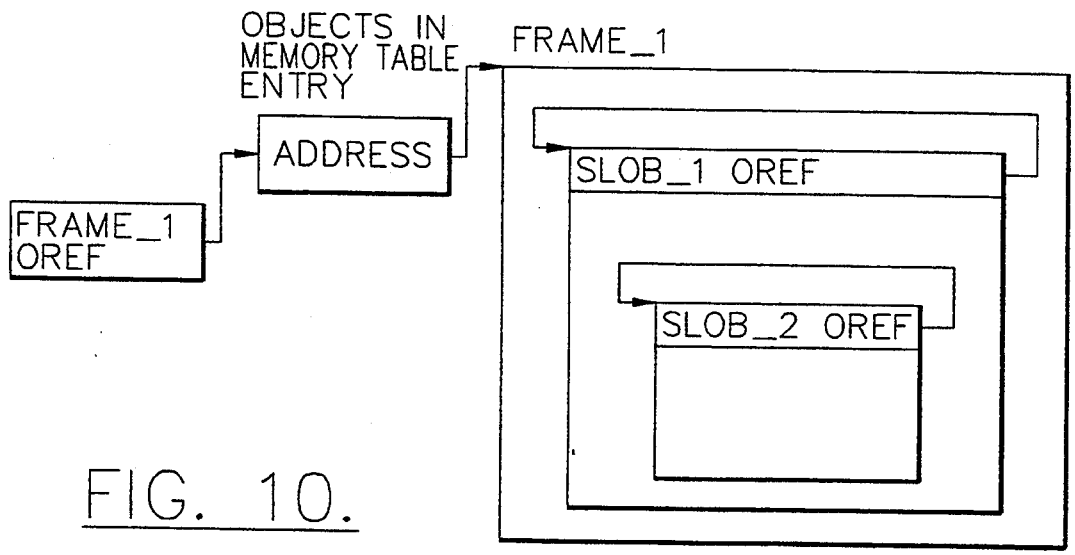
FIG. 10 illustrates manipulation of a frame having a slot object of the present invention.

This example is the same as Three Frame Example 1, except that Slot Objects of the present invention are used in place of Frame__2 and Frame__3. Example 2 illustrates the enhanced performance which slot objects provide over normal objects in terms of memory utilization, the object management table, and messaging overhead. The physical in-memory representation of this example is illustrated in FIG. 10.

Initially, some method containing an OREF to Frame__1 (object) sends a message to Frame__1 (object). The address of Frame__1's Objects__In__Memory__Table entry is contained within this OREF. The Messenger receives the OREF and checks the Objects__In__Memory__Table to determine if the object (Frame__1) is in memory. Assuming that Frame__1 is in memory, the Messenger resolves the method address. The Messenger sets up the data addressing through the Object Manager's table entry. Finally, the specified method on Frame__1 is invoked.

For purposes of this Example 2, it is assumed that the object can be a Slot__Object, and that it has been made a slot object. The invoked method in Frame__1 sends a message to Slot__Obj__1. The Messenger receives the OREF. Since this OREF is for a slot object, no entry exists in the Objects__In__Memory__Table and therefore, it is not necessary to check the table. Since slot objects provide the data structure in line within the frame, all slots are materialized and dematerialized at the same time as their enclosing frame. Therefore, since the frame is in memory, so is the slot object. No address needs to be resolved nor does any external accessing need to be performed.

Next, the Messenger resolves the method address. The Messenger then sets up the data address from the start of Slot__Obj__1. Since Slot Objects use direct addressing to the beginning of the Slot Object itself, no address resolution need be done as in the case of conventional frames which use indirect addressing via the Objects__In__Memory__Table. The specified method on Slot__Obj__1 is invoked.

This method in Slot__Obj__1 sends a message to Slot__Obj__2. The Messenger receives the OREF. Since this OREF is for a slot object, no entry exists on the Objects__In__Memory__Table and therefore it is not necessary to check the Table. Since slot objects provide the data structure in line with the frame, all slots are materialized and dematerialized at the same time as their enclosing frame. Therefore, since the enclosing frame is in memory, so is the slot object. Thus, no address needs to be resolved and no external memory access needs to be performed.

Next, the Messenger resolves the method address. The Messenger then sets up the data address from the start of Slot__Obj__2. Since slot objects use direct addressing, no address needs to be resolved as in the case of traditional frames which use indirect addressing via the Objects__In__Memory__Table. Finally, the specified method on Slot__Obj__2 is invoked.

One additional savings not evident here is that exported slot attributes can be accessed by direct structure reference without sending a message. As understood by those having skill in the art, an exported attribute is an attribute that is available to other objects, rather than for internal use only. Frame objects require messages to get to their exported attributes.

EXAMPLE 3: FRAME WITH SLOT OBJECT HAVING VARIABLE AREA

Figure 11:
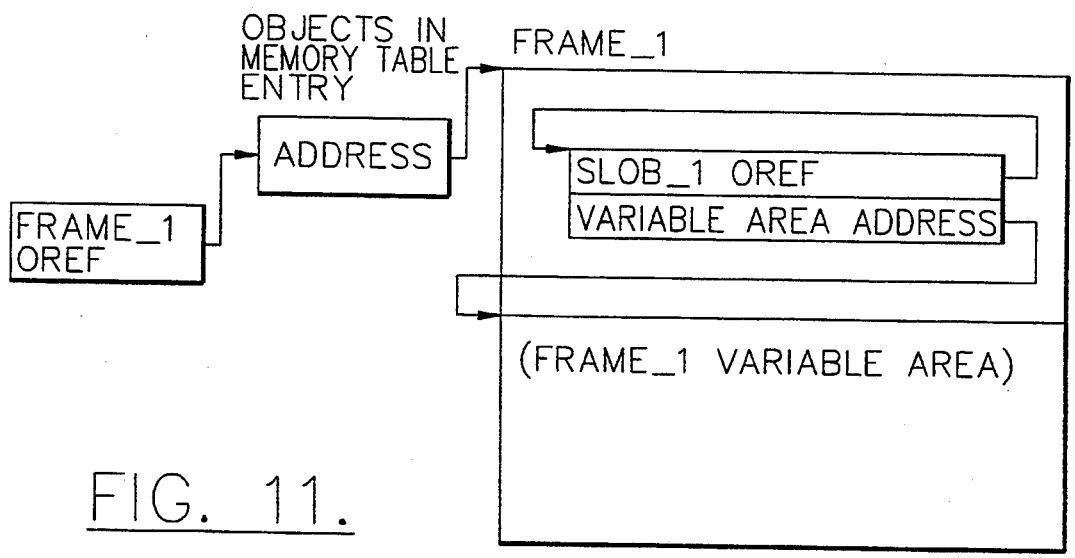
FIG. 11 illustrates manipulation of a frame having a variable area slot object of the present invention.

This example illustrates an operation where a Frame, Frame__1, has an enclosed Slot Object, Slot__Obj__1, which utilizes the Frame's Variable Area. This example may be considered in terms of a specific example, such as "Person" for Frame_1, and "Name" for Slot_Obj_1. Since name is probably variable in size, let it be assumed that Slot_Obj_1 utilizes the enclosing frame's Variable Area for storing the name. The in-memory representation of this example is illustrated in FIG. 11.

Initially, some method containing a OREF to Frame_1, sends a message to Frame_1 (object). The address of Frame_1's Object Manager table entry is contained within this OREF. The Messenger receives the OREF and checks the Object Manager's Objects_In_Memory_Table to determine if the object (Frame_1) is in memory. Assuming that Frame_1 is in memory, the Messenger resolves the method address. The Messenger then sets up the data addressing through the Object Manager's table entry. Finally, the specified method on Frame_1 is invoked.

This method in Frame_1 sends a message to Slot_Obj_1. The Messenger receives the OREF. Since this OREF is for a slot object, no entry exists in the Object Manager's Objects_In_Memory_Table and therefore, it is not necessary to check the table. Since slot objects provide data structure in line within the frame, all slots are materialized and dematerialized at the same time as their enclosing frame. Moreover, since the frame is in memory, so is the slot object. Thus, no addresses need to be resolved nor does any external accessing need to be performed.

Next, the Messenger resolves the method address. The Messenger then sets up the data address from the start of the Slot_Obj_1. Since Slot Objects use direct addressing to the beginning of the Slot Object itself, no address resolution need be done as in the case of conventional frames which use indirect addressing via the Objects_In_Memory_Table. The Var_Area_Address within Slot_Obj_1 is used to directly access the variable area within Frame_1. The specified method on Slot_Obj_1 is then invoked.

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim is:

1. A process for manipulating data in an object oriented computer system, said object oriented computer system including a plurality of objects and a plurality of instances, each object comprising an object frame and at least one object method, said object frame containing an attribute of said object, each instance being associated with one of said objects and including an instance frame which contains data related to a corresponding attribute of the associated object, said object management table including a pointer therein for each instance, said at least one object method comprising at least one method performed by said computer system upon the data in an associated instance frame, said object oriented computer system further including a plurality of slot objects, each of which is associated with at least one of said plurality of objects each of said slot objects containing therein data which is encapsulated in said slot object, and at least one slot object method which is performed by said computer system upon said data which is encapsulated in said slot object, said process for manipulating data comprising the following steps performed by said object oriented computer system:

identifying a pointer from said object management table, which points to a selected one of said instances which is selected by said computer system under control of one of said object methods which is performed by said computer system upon the data in an associated instance frame;

performing the object method on the instance which is identified by said pointer;

encountering a slot object which is associated with the performed object method; and manipulating the data in said slot object using said at least one slot object method without obtaining a pointer in said object management table.

* * * * *